(12) United States Patent
Oh (10) Patent No.: US 9,936,107 B2
(45) Date of Patent: Apr. 3, 2018

(54) APPARATUS AND METHOD FOR GENERATING SENSORY EFFECT METADATA

(71) Applicant: Electronics and Telecommunications Research Institute, Daejeon (KR)

(72) Inventor: Hyun-Woo Oh, Daejeon (KR)

(73) Assignee: Electronics and Telecommunications Research Institite, Daejeon (KR)

( * ) Notice: Subject to any disclaimer, the term of this patent is extended or adjusted under 35 U.S.C. 154(b) by 179 days.

(21) Appl. No.: 14/931,290

(22) Filed: Nov. 3, 2015

(65) Prior Publication Data

US 2016/0182771 A1 Jun. 23, 2016

(30) Foreign Application Priority Data

Dec. 23, 2014 (KR) ........................ 10-2014-0187540

(51) Int. Cl.
| | |
|---|---|
| *H04N 7/00* | (2011.01) |
| *H04N 11/00* | (2006.01) |
| *H04N 5/222* | (2006.01) |
| *G06F 17/30* | (2006.01) |

(Continued)

(52) U.S. Cl.
CPC ....... *H04N 5/2224* (2013.01); *G06F 17/3002* (2013.01); *G06T 7/73* (2017.01); *G06T 2207/10016* (2013.01); *H04N 5/144* (2013.01)

(58) Field of Classification Search
USPC ... 348/460, 451, 431.1, 416.1, 413.1, 407.1, 348/402.1, 500, 508, 523, 567, 602, 639, 348/646, 699, 714, 716, 719, 720, 725, 348/345, 352, 297, 294, 240.99, 240.3, 348/237, 231.9, 220.1, 211.9, 208.12, 348/208.6, 208.3, 189, 174, 169, 155, 348/154, 142, 137, 97, 64, 50, 49, 48, 47,
(Continued)

(56) References Cited

U.S. PATENT DOCUMENTS 9,271,048 B2 * 2/2016 Yee ...................... H04N 21/485
2008/0320508 A1 * 12/2008 Ramaswamy ......... H04N 7/163
725/9

(Continued)

FOREIGN PATENT DOCUMENTS

KR 1020090038835 A 4/2009
KR 1020100114482 A 10/2010
(Continued)

OTHER PUBLICATIONS

Hyun-Woo Oh et al., "Convergence Media Service Platform for Real Sense Experience," ICEIC 2014, Jan. 15-18, 2014, pp. 609-610.

*Primary Examiner* — Brian Yenke
*Assistant Examiner* — Mustafizur Rahman
(74) *Attorney, Agent, or Firm* — Willaim Park & Associates Ltd.

(57) ABSTRACT

A sensory effect metadata generating device is disclosed which includes a memory for storing a program for generating a sensory effect metadata corresponding to media and a processor for perform the program. The program is configured to extract characteristic points from the media, produce at least one of an object variation based on the characteristic points, an object zoom-in information, an incline information and a move information; and generate the sensory effect metadata.

14 Claims, 6 Drawing Sheets

(51) Int. Cl.
*G06T 7/73* (2017.01)
*H04N 5/14* (2006.01)

(58) Field of Classification Search
USPC .................. 348/25; 382/103; 386/769, 802; 707/769, 802; 725/74
See application file for complete search history.

(56) References Cited

U.S. PATENT DOCUMENTS

| | | | |
|---|---|---|---|
| 2010/0274817 A1* | 10/2010 | Choi | G06F 17/30265 707/802 |
| 2010/0275235 A1* | 10/2010 | Joo | H04N 5/262 725/74 |
| 2011/0125787 A1* | 5/2011 | Choi | G11B 27/034 707/769 |
| 2011/0125788 A1* | 5/2011 | Joo | G11B 27/034 707/769 |
| 2011/0125789 A1* | 5/2011 | Joo | G06F 3/011 707/769 |
| 2011/0125790 A1* | 5/2011 | Choi | G11B 27/034 707/769 |
| 2011/0188832 A1* | 8/2011 | Choi | H04N 21/235 386/239 |
| 2011/0243524 A1* | 10/2011 | Cho | H04N 9/8205 386/230 |
| 2011/0296452 A1* | 12/2011 | Yu | H04H 60/37 725/9 |
| 2012/0033937 A1 | 2/2012 | Kim et al. | |
| 2012/0201417 A1* | 8/2012 | Park | G06F 3/017 382/103 |
| 2012/0281138 A1 | 11/2012 | Choi et al. | |
| 2013/0249947 A1* | 9/2013 | Reitan | G06F 3/011 345/633 |
| 2013/0315313 A1* | 11/2013 | Yang | H04N 19/513 375/240.16 |
| 2013/0322856 A1 | 12/2013 | Etri | |
| 2014/0129935 A1* | 5/2014 | Ovadia Nahon | G06F 3/01 715/716 |
| 2014/0148220 A1 | 5/2014 | Etri | |
| 2014/0310587 A1* | 10/2014 | Oh | G06F 17/241 715/233 |
| 2015/0125036 A1* | 5/2015 | Bilobrov | G06K 9/00067 382/103 |
| 2016/0269678 A1* | 9/2016 | Yun | H04N 21/435 |

FOREIGN PATENT DOCUMENTS

| | | |
|---|---|---|
| KR | 1020100114857 A | 10/2010 |
| KR | 1020130134130 A | 12/2013 |
| KR | 1020140075825 A | 6/2014 |
| WO | 2009051428 A1 | 4/2009 |
| WO | 2010120137 A2 | 10/2010 |

* cited by examiner

APPARATUS AND METHOD FOR GENERATING SENSORY EFFECT METADATA

CROSS REFERENCE TO RELATED APPLICATION

This application claims the benefit of Korean Patent Application No. 10-2014-0187540, filed on Dec. 23 2014, entitled "APPARATUS AND METHOD FOR GENERATING SENSORY EFFECT METADATA", which is hereby incorporated by reference in its entirety into this application.

BACKGROUND OF THE INVENTION

1. Technical Field

The present invention relates to a technology for generating sensory effect metadata for providing a media-based sensory experience, more particularly to a technology for generating sensory effect metadata corresponding to tilting, rotation, zoom-in, zoom-out, camera-moving and camera-rotation of objects included in media.

2. Description of the Related Art

The technology for providing an sensory experience service based on media is a technology that MPEG-V international standard sensory effect metadata is added to a conventional media so as to reproduce a media, and that a system for reproducing the media reproduces the media along with parsing the sensory effect metadata so as for an sensory experience device to make an sensory experience in synchronization with the media reproduction.

According to a conventional method for generating sensory effect metadata, a producer watches repeatedly media so as to memorize the time point and then manually inputs sensory effect metadata which corresponds to the time point; or a sensory effect metadata generating device is input with experimental attribute value at an intended time and a sensory effect to be desired through authoring tool by a producer so as to generating a sensory effect metadata.

Therefore due to the sensory effect metadata, a device for producing an sensory experience such as 4D motion chair can provide a user with sensory effect.

In the conventional method for generating sensory effect metadata, however, the sensory effect metadata should be generated based on a producer's input.

SUMMARY OF THE INVENTION

This invention provides a device and method for generating a sensory effect metadata which automatically generates sensory effect metadata based on the focus change of camera and the moving of object shown in a media.

According to one aspect of this invention, there is provided with A sensory effect metadata generating device comprising: a memory for storing a program for generating a sensory effect metadata corresponding to media; and a processor for perform said program, wherein said program is configured to: extract characteristic points from said media; produce at least one of an object variation based on said characteristic points, an object zoom-in information, an incline information and a move information; and generate said sensory effect metadata in accordance with said at least one of the object variation, the object zoom-in information, the incline information and the move information.

The program may be configured to select effective characteristic points which locates at contour position of the object among the characteristic points, and generate the object zoom-in information in accordance with the width of octagon the vertex of which is a size reference point of effective characteristic points; and the size reference point is through the center of the object and is a point which locates on the three lines having predetermined angles with a predetermined reference direction.

In case that the distance between (i+1)th effective characteristic point and (i+2)th effective characteristic point is longer than or equal to the distance between (i)th effective characteristic point and the (i+2)th effective characteristic point, the program may be configured to compensate the value of the (i+1)th effective characteristic point with the value of the (i+2)th effective characteristic point to the same; and the i is a natural number more than or equal to 1 and the (i+1)th effective characteristic point is the effective characteristic point closest located at the (i)th effective characteristic among effective characteristic points after (i)th effective characteristic point.

The program may be configured to: calculate average vectors of each characteristic point vectors of local sectors; calculate a global rotation angle which is a rotation angle corresponding to the average of the average vector per the local sectors and generate an incline information including the global rotation angle, when the direction difference between the average vectors of the local sectors is more than a predetermined value; and generate a move information including the average of the average vectors per local sectors, when the direction difference between the average vectors per the local sectors is less than or equal to a predetermined value.

The program may be configured to apply a weighted value comparative with a radial type sector value to a target vector and then update the average vector as an average for each characteristic point vector per the local sectors, when a scalar value corresponding to the difference between the average vector and a target vector which is a vector among each characteristic points included in the local sectors is less than a predetermined value.

The program may be configured to: select variation characteristic points which is characteristic points having a variation higher than a predetermined value; select a region including the variation characteristic points as an object region, when a media is divided by regions having a predetermined size; calculate an object move vector by tracking the position of characteristic points on object region; calculate a rotation speed and a direction of the object based on the average variation of the characteristic points per respective regions having a predetermined size which constitute the object region; and select a central axis of the object and calculate an object inclination based on vector variation with reference to the central axis.

The program may be configured to: generate a motion data including at least one of the object variation based on the characteristic points, the object zoom-in information, the incline information, and the move information; and generate a sensory effect metadata mapped with a motion pattern corresponding to the motion data.

The program may be configured to: calculate vectors by vector positioning the motion data; calculate a neighboring vector difference corresponding to neighboring vectors among the vectors; and in case that the variation of the neighboring vector difference satisfy any one of one or more predetermined requirements, map the motion pattern corresponding to the satisfied requirement to a current motion pattern.

According to another aspect of this invention, there is provided with a method for generating a sensory effect metadata by a sensory effect metadata generating device, comprising the steps of: extracting characteristic points from the media; calculating at least one of an object variation based on the characteristic points, an object zoom-in information, an incline information and a move information; and generating the sensory effect metadata in accordance with the at least one of the object variation, the object zoom-in information, the incline information and the move information.

The step of calculating at least one of an object variation based on the characteristic points, an object zoom-in information, an incline information and a move information may comprise the steps of: selecting effective characteristic points which locates at contour position of the object among the characteristic points; and generating the object zoom-in information in accordance with the width of octagon the vertex of which is a size reference point of effective characteristic points, and wherein the size reference point is through the center of the object and is a point which locates on the three lines having predetermined angles with a predetermined reference direction.

The step of calculating at least one of an object variation based on the characteristic points, an object zoom-in information, an incline information and a move information may comprise the step of, when the distance between (i+1)th effective characteristic point and (i+2)th effective characteristic point is longer than or the same with the distance between (i)th effective characteristic point and the (i+2)th effective characteristic point, compensating the value of the (i+1)th effective characteristic point with the value of the (i+2)th effective characteristic point to the same; and wherein the i is a natural number equal to or higher than 1 and the (i+1)th effective characteristic point is the effective characteristic point closest located at the (i)th effective characteristic among effective characteristic points after (i)th effective characteristic point.

The step of calculating at least one of an object variation based on the characteristic points, an object zoom-in information, an incline information and a move information may comprise the steps of: calculating average vectors of each characteristic point vectors of local sector; calculating a global rotation angle which is a rotation angle corresponding to the average of the average vector per the local sectors and generate an incline information including the global rotation angle, when the direction difference between the average vectors per the local sectors is more than a predetermined value; and generating a move information including the average of the average vectors per local sectors, when the direction difference between the average vectors per the local sectors is less than or equal to a predetermined value.

The step of calculating at least one of an object variation based on the characteristic points, an object zoom-in information, an incline information and a move information may comprise the step of: applying a weighted value comparative with a radial type sector value to a target vector and then update the average vector as an average for each characteristic point vector per the local sectors, when a scalar value corresponding to the difference between the average vector and a target vector which is a vector among each characteristic points included in the local sectors is less than a predetermined value.

The step of calculating at least one of an object variation based on the characteristic points, an object zoom-in information, an incline information and a move information may comprise the steps of: selecting variation characteristic points which is characteristic points having a variation higher than a predetermined value; selecting a region including the variation characteristic points as an object region, when a media is divided by regions having a predetermined size; calculating an object move vector by tracking the position of characteristic points on object region; calculating a rotation speed and a direction of the object based on the average variation of the characteristic points per respective regions having a predetermined size which constitute the object region; and selecting a central axis of the object and calculate an object inclination based on vector variation with reference to the central axis.

The step of calculating at least one of an object variation based on the characteristic points, an object zoom-in information, an incline information and a move information may comprise the steps of: generating a motion data including at least one of the object variation based on the characteristic points, the object zoom-in information, the incline information, and the move information; and generating a sensory effect metadata mapped with a motion pattern corresponding to the motion data.

The step for generating a sensory effect metadata mapped with a motion pattern corresponding to the motion data may comprise the steps of: calculating vectors by vector positioning the motion data; calculating a neighboring vector difference corresponding to neighboring vectors among the vectors; and in case that the variation of the neighboring vector difference satisfy any one of one or more predetermined requirements, mapping the motion pattern corresponding to the satisfied requirement to a current motion pattern.

The sensory effect metadata generating device according to one embodiment of this invention can automatically generate sensory effect metadata.

The sensory effect metadata generating device according to one embodiment of this invention can generate a sensory effect metadata based on the motion of object included in a media so as for the sensory effect reproducing device to reproduce a sensory effect in exact synchronization with the contents of the media.

DESCRIPTION OF THE EXEMPLARY EMBODIMENTS

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Hereinafter, in the explanation of the embodiments of this invention, when the gist of this invention would become unnecessarily unclear due to the detailed explanation of the related known function or art, the detailed explanation thereof will be omitted. Terms such as "first" and "second" can be used in merely distinguishing one element from other identical or corresponding elements, but the above elements shall not be restricted to the above terms.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Hereinafter, the embodiments of this invention will be in detail explained with reference to the attached drawings. In explanation of this invention, the same means may have the same reference numerals irrespective of different drawings for the sake of easiness of perspective understanding.

Figure 1:
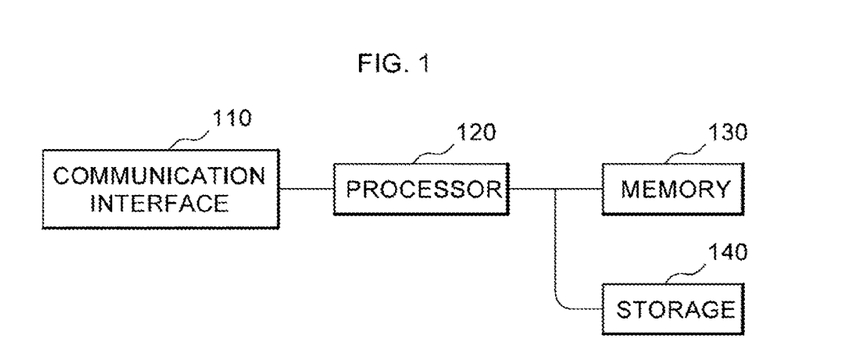
FIG. 1 is an illustrative block diagram of the sensory effect metadata generating device according to one embodiment of this invention.

FIG. 1 is a illustrative block diagram of the sensory effect metadata generating device according to one embodiment of this invention.

The sensory effect metadata generating device according to one embodiment of this invention includes a communication interface 110, a processor 120, a memory 130 and a storage 140.

The communication interface 110 receives a media from outside according to a predetermined protocol and outputs a sensory effect metadata generated by the sensory effect metadata generating device.

The processor 120 produces the sensory effect metadata corresponding to the media based on a predetermined program.

The memory 130 stores the predetermined program for the generation of the sensory effect metadata. The memory 130 may be a volatile memory such as a random access memory (RAM).

The storage 140 stores the predetermined program for the generation of sensory effect metadata so as to provide the program to the memory 130. Accordingly, the processor 120 can perform the process of generation of sensory effect metadata under the program stored in the memory 130.

Hereinafter, referring to FIG. 2, it will be in more detail explained that the sensory effect metadata generating device generates the sensory effect metadata corresponding to the media.

Figure 2:
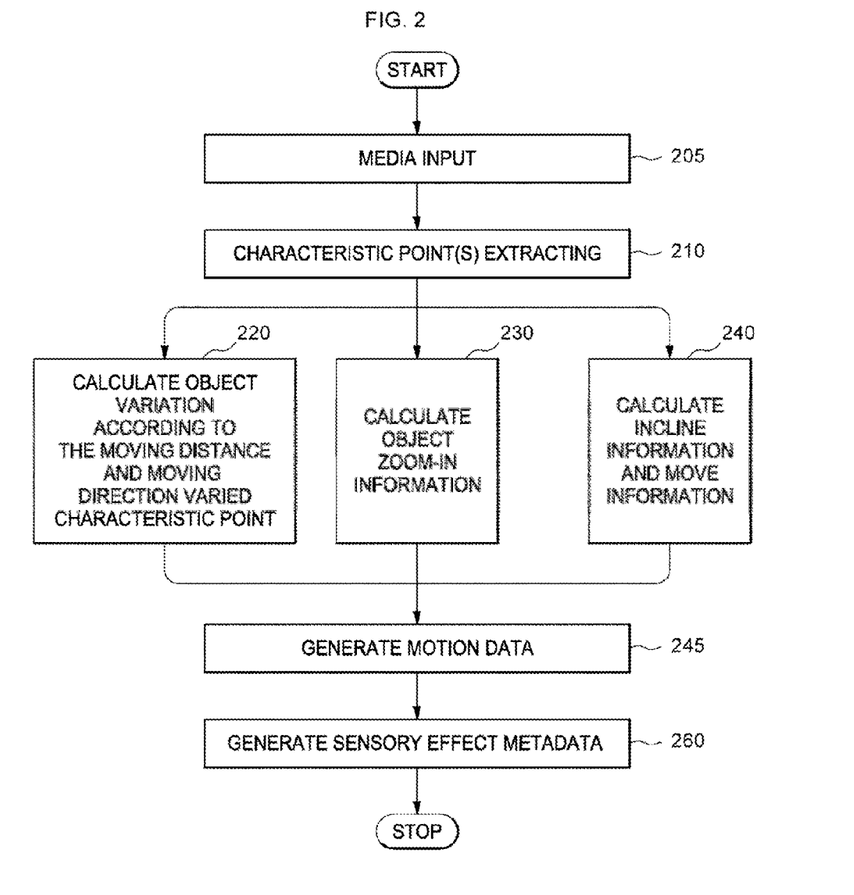
FIG. 2 is a flow chart illustrating the process of generating a sensory effect metadata by the sensory effect metadata generating device according to one embodiment of this invention.

FIG. 2 is a flow chart illustrating the process of generating the sensory effect metadata by the sensory effect metadata device according to one embodiment of this invention. Each step hereinafter explained is a step that the processor 220 of the sensory effect metadata generating device performs the program stored in the memory 230. Here, however, the explanation of computer device's general process such as referring to the program of memory will be omitted for the sake of clear and concise explanation of this invention, and then the subject of respective step will be commonly called as the sensory effect metadata generating device.

Referring to FIG. 2, the step 205, the sensory effect metadata generating device receives a media through the communication interface 110.

In step 210, the sensory effect metadata generating device extracts characteristic points from the media. Here, the characteristic points can be mainly extracted at the point(s) on the border line between the background and object(s), or on moving object(s).

In step 215, the sensory effect metadata generating device calculates the variation(s) of respective characteristic point (s) and selects the variation characteristic point(s) the variation of which is equal to or more than a predetermined threshold value. Here, the variation of characteristic point means the distance that the characteristic point has moved during a predetermined time period.

In step 220, the sensory effect metadata generating device calculates an object variation with reference to the characteristic point. For example, the object variation is an information including at least one of the moving direction and distance of the object on the media, the rotation speed and direction of the object, and the inclination of the object. The calculation process of the object variation will be in more detail explained later with reference to FIG. 5.

In step 230, the sensory effect metadata generating device can calculate an object zoom-in information, which represents the degree of Zoom-in/Zoom-out of the object, based on the variation characteristic point located on the contour of the object. The calculation process of object zoom-in information will be in more detail explained later, referring to FIG. 3.

In step 240, the sensory effect metadata generating device calculates the rotation angle based on the vector corresponding to the characteristic point per respective local sector, and calculate the rotation angle representing the rotation degree of entire characteristic point(s) (hereinafter it is called as 'global rotation angle') which is generated in accordance with the rotation of camera as the rotation angle or the vector representing the moving of entire characteristic point(s) (hereinafter it is called as 'global moving vector) which is generated in accordance with the moving of the camera. The calculation process of the global rotation angle or the global moving vector will be in more detail explained later, referring to FIG. 4.

In step 245, the sensory effect metadata generating device generates the motion data including at least one of the object variation, the object zoom-in information, the global rotation angle and the global moving vector.

In step 250, the sensory effect metadata generating device generates the sensory effect metadata including a motion pattern corresponding to the motion data among predetermined motion pattern(s). For example, the sensory effect metadata generating device can store a plurality of motion patterns corresponding to respective motion data, and generate the sensory effect metadata including motion pattern corresponding to the generated motion data.

Figure 3:
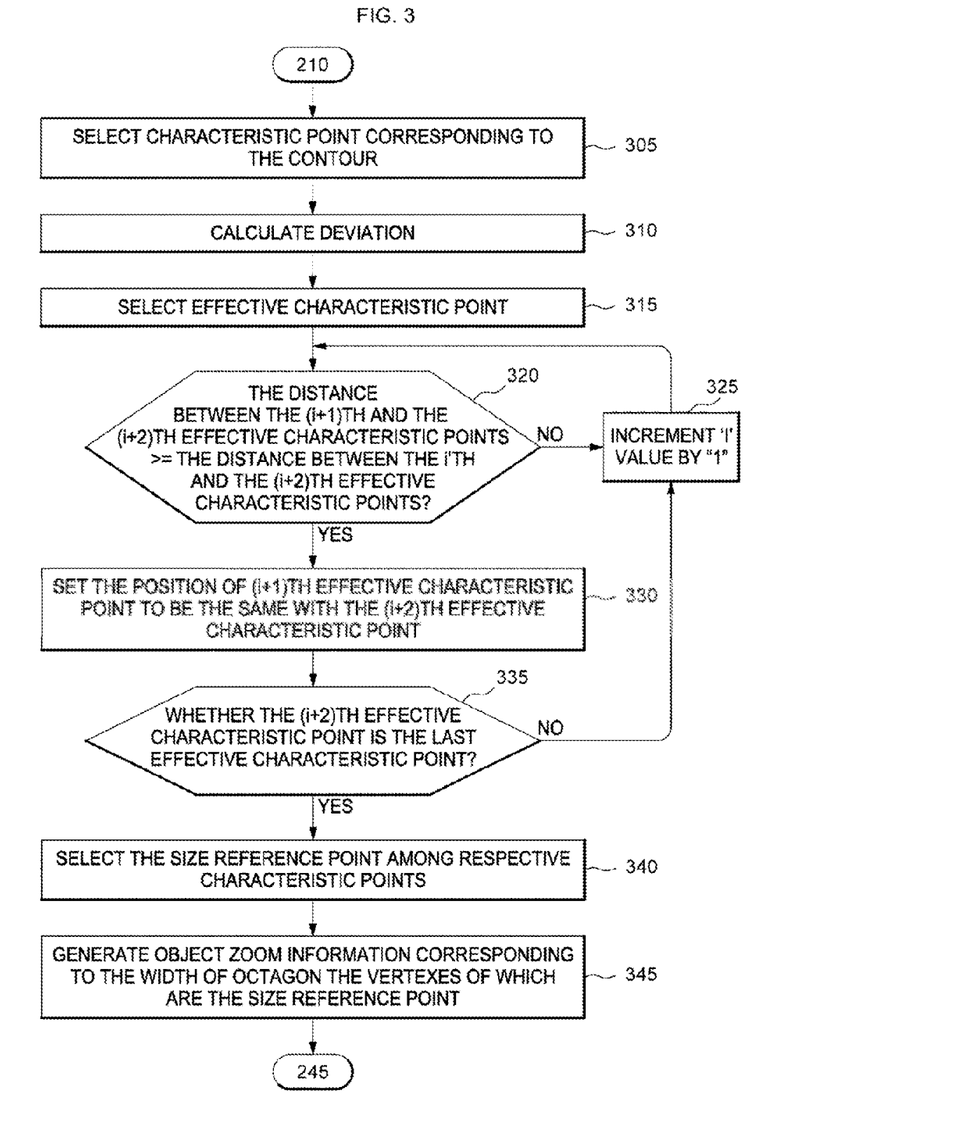
FIG. 3 is a flow chart illustrative of generating an object zoom-in information by the sensory effect metadata generating device according to one embodiment of this invention.

FIG. 3 is a flow chart illustrating that the sensory effect metadata generating device produces an object zoom-in information, according to one embodiment of this invention. Here, FIG. 3 is an illustrative flow chart of the process corresponding to the step 230 of FIG. 2 as described above.

Referring to FIG. 3, in step 305, the sensory effect metadata generating device selects characteristic point(s) corresponding to the contour. For example, the sensory effect metadata generating device can divide the image of media into a plurality of region having a predetermined size, and can select the characteristic point of the region which includes equal to or more than a predetermined number of characteristic point(s).

In step 310, the sensory effect metadata generating device calculates a deviation between the characteristic points (a distance between the characteristic points) selected in step 305.

In step 315, the sensory effect metadata generating device selects the characteristic point having a deviation corresponding to respective characteristic point being equal to or lower than a predetermined value as an effective characteristic point. Here, the effective characteristic point may mean the characteristic point to be based for producing the object zoom-in information.

In step 320, the sensory effect metadata generating device determines whether the distance between (i+1)th and (i+2)th effective characteristic points is equal to or longer than the distance between i'th and (i+2)th effective characteristic points. Here, 'i' is a natural number equal to or more than "1" and the initial value thereof may be set as "1". Also, (i+1)th effective characteristic point may be the characteristic point located nearest at the (i)th effective characteristic point among the effective characteristic points following the (i)th effective characteristic point. If there are a plurality of effective characteristic points nearest at the (i)th effective characteristic point, the effective characteristic point located in a predetermined range of direction with regard to the (i)th effective characteristic point may be selected as the (i+1)th effective characteristic point.

If, in step 320, the distance between the (i+1)th and the (i+2)th effective characteristic points is shorter than the distance between the (i)th and the (i+2)th effective characteristic points, the sensory effect metadata generating device increases the value of "i" by "1" in step 325.

If, in step 320, the distance between the (i+1)th and the (i+2)th effective characteristic points is equal to or longer than the distance between the (i)th and the (i+2)th effective characteristic points, the sensory effect metadata generating device set the position of the (i+1)th effective characteristic point to be same as the position of the (i+2)th effective characteristic point in step 330.

In step 335, the sensory effect metadata generating device determines whether the (i+2)th effective characteristic point is the last effective characteristic point.

If, in step 335, the (i+2)th effective characteristic point is not the last effective characteristic point, the sensory effect metadata generating device performs the process from the step 325 again.

If, in step 335, the (i+2)th effective characteristic point is the last effective characteristic point, the sensory effect metadata generating device sets the size reference point among respective effective characteristic points in step 340. Here, the size reference point is the effective characteristic point located on or nearest at the line which go through the center point of the object and has a direction having an angle of 0°, 45° or 90° with regard to the predetermined reference direction. Accordingly, the size reference point can be "8" in total.

In step 345, the sensory effect metadata generating device can calculate the width of octagon having 8 size reference points as vertexes, and can generate an object zoom information in accordance with the variation from the width of the octagon corresponding to the previous frame of media to the width of the octagon currently calculated. For example, the sensory effect metadata generating device can generate an object zoom-in information including the value which is made by multiplying the width of the octagon by a predetermined number.

Figure 4:
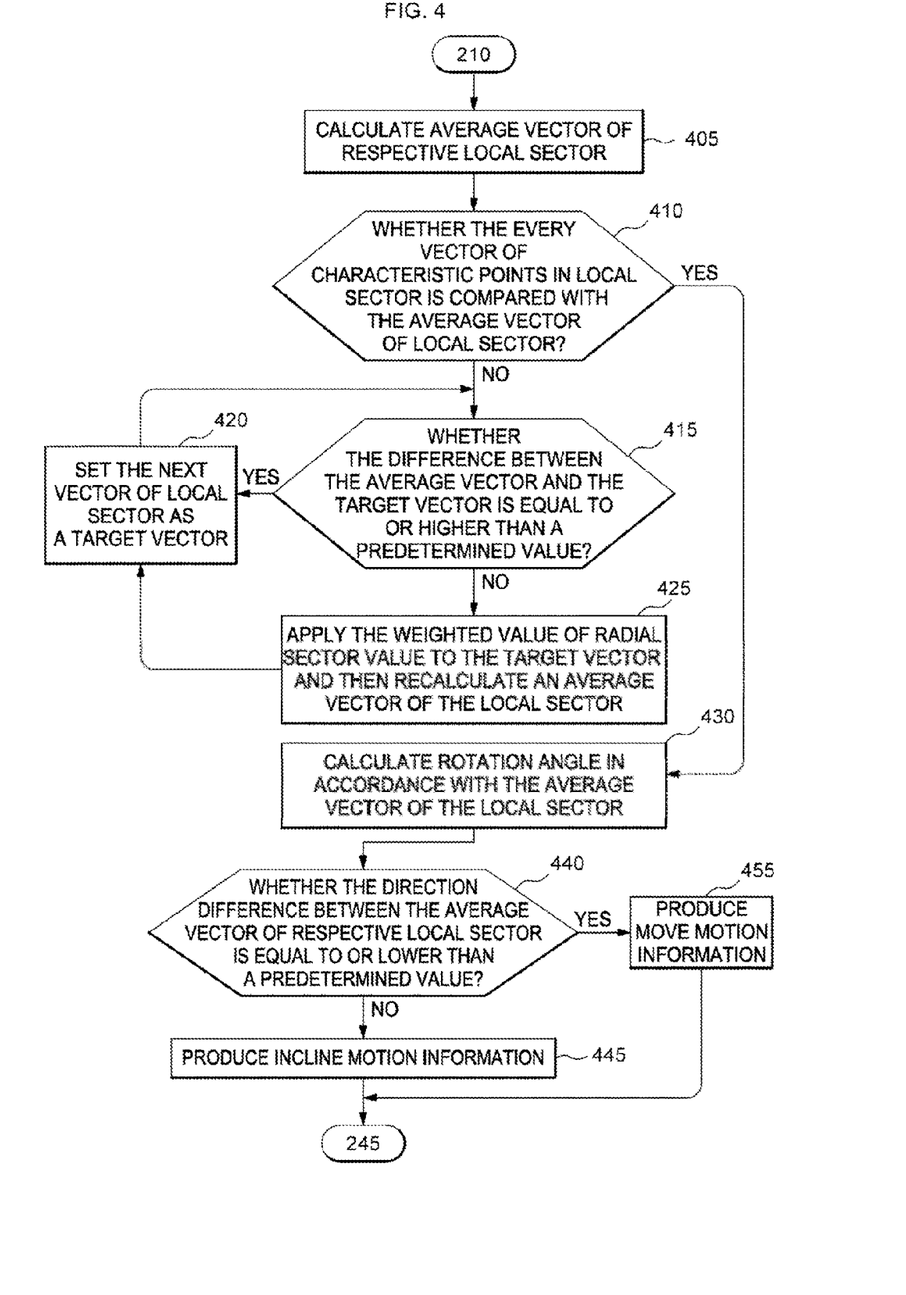
FIG. 4 is a flow chart illustrating the process of generating an incline information or a move information by the sensory effect metadata generating device according to one embodiment of this invention.

FIG. 4 is a flow chart for illustrating the process that the sensory effect metadata generating device generates an incline information or a move information, according to one embodiment of this invention. Here, FIG. 4 may be a flow chart for illustrating the process corresponding to the step 240 of FIG. 2 as described above.

Referring to FIG. 4, in step 405, the sensory effect metadata generating device calculates an average vector which is the average of respective characteristic point's vector per local sector. Here, the sensory effect metadata generating device may set the region, in which the characteristic point(s) is distributed, as a plurality of local sectors with reference to the center point of respective characteristic point(s).

The center point means the point located at the position corresponding to the average of horizontal coordinates and the average of vertical coordinates of respective characteristic points. For example, the sensory effect metadata generating device may set the region having a predetermined angle with reference to the center point as a local sector. That is, if the sensory effect metadata generating device set the region 15° with reference to the center point as a local sector, the sensory effect metadata generating device can set 24 local sectors.

In step 410, the sensory effect metadata generating device determines whether the every vector included in the respective local sector should be compared with the average vector of the local sector.

If, in step 410, the every vector included in the respective local sector is not compared with the average vector of the local sector, the sensory effect metadata generating device determines whether the scalar value of the difference between the average vector and the target vector is equal to or higher than a predetermined value in step 415. Here, the target vector may be a vector corresponding to one of characteristic points located at the local sector.

If the scalar value of the difference between the average vector and the target vector is equal to or higher than a predetermined value in step 415, the sensory effect metadata generating device sets one of vectors of the local sector, which is not compared with the average vector in step 410, as a target vector.

If the scalar value of the difference between the average vector and the target vector is lower than a predetermined value in step 415, the sensory effect metadata generating device applies the weighted value of radial sector value to the target vector and then recalculates an average vector of the local sector in step 425.

Here, the weighted value of radial sector value is a predetermined value corresponding to the direction difference and to the scalar value difference between the target vector and the average vector of the local vector. Here, the weighted value of radial sector value may be set to the higher value in accordance with the higher similarity of the direction and the scalar value between the target vector and the average vector of the local sector. Accordingly, if the average vector is recalculated for the target vector applied with the weighted value, it can be reduced that the vector reducing the variation of the average vector is reflected to the average vector. Thus, the sensory effect metadata generating device can measure in more accurate the variation of the average vector of the local sector.

In step 403, the sensory effect metadata generating device calculates a rotation angle in accordance with the average vector of the local sector. That is, the sensory effect metadata generating device can calculate a rotation angle which shows the degree of variation of the direction of the average vector of the local sector in accordance with the time.

In step 440, the sensory effect metadata generating device determines whether the direction difference between the average vectors of respective local sectors is equal to or lower than a predetermined value.

If the direction difference between the average vectors of local sectors is higher than the predetermined value in step 440, the sensory effect metadata generating device sets the motion of media to an incline motion which is one of predetermined motions, in step 445. Here, the incline motion may be a motion that the sensory effect implementing apparatus implements in the situation of camera's being inclined.

Also, the rotation angle showing the degree of incline may be set as an attribute of the incline motion. The sensory effect metadata generating device can calculates the global rotation angle which is the rotation angle of the average vector with regard to the average vector of respective local sector, and set the global rotation angle as an attribute of the incline motion.

If the direction difference between the average vectors of local sectors is equal to or lower than the predetermined value in step 440, the sensory effect metadata generating device maps the motion of media as a move motion which is one of predetermined motions in step 450.

Here, the move motion may be a motion that the sensory effect implementing apparatus implements in the situation that the camera is moved in the specific direction. The direction and the size of camera moving may be set as attributes of move motion. The sensory effect metadata generating device may set the global motion vector which is an average of the average vectors of respective local sectors, as an attribute of move motion.

Figure 5:
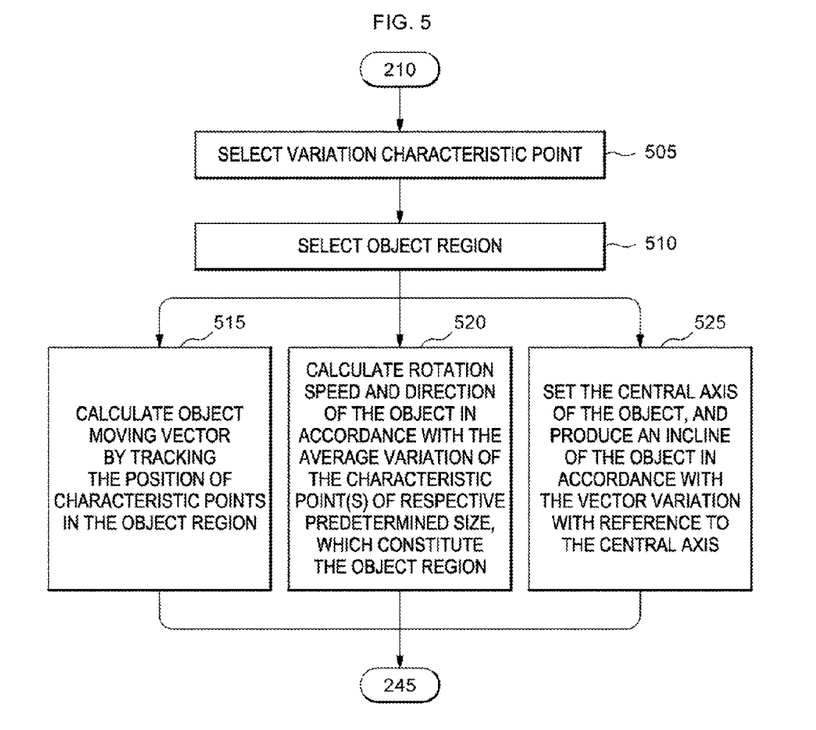
FIG. 5 is a flow chart illustrating the process of calculating an object variation by the sensory effect metadata generating device according to one embodiment of this invention.

FIG. 5 is a flow chart for illustrating the process that the sensory effect metadata generating device generates an object variation, according to one embodiment of this invention. Here, FIG. 5 may be a flow chart for illustrating the process corresponding to the step 220 of FIG. 2 as described above.

In step 505, the sensory effect metadata generating device sets the characteristic point having variation equal to or higher than a predetermined value (hereinafter, it is called as 'variation characteristic point').

In step 510, when the media is divided into predetermined size of regions, the sensory effect metadata generating device sets the region including the variation characteristic point as the region at which the object locates (hereinafter, it is called as 'object region').

In step 515, the sensory effect metadata generating device tracks the position of characteristic point(s) on the object region and produces an object moving vector showing the moving distance and the distance of object on the media.

In step 520, the sensory effect metadata generating device produces a rotation speed and a direction of the object in accordance with the average variation of the characteristic points of respective region having predetermined size. The sensory effect metadata generating device can produce the rotation speed and the direction of the object according to triangulation method, with reference to the central point of scene, the point corresponding to the average vector at the start time of rotation of the object with regard to the central point (the average of vectors of respective characteristic points on the object), and the point corresponding to the average vector at the end time of moving with regard to the central point.

In step 525, the sensory effect metadata generating device sets the central axis of the object, and produce an incline of the object by calculating the vector variation with reference to the central axis. The sensory effect metadata generating device can select a predetermined number of vectors having low variation among the vectors corresponding to the object, and set the line having a minimum distance to the point(s) corresponding to the selected respective vectors as a central axis. Also, the sensory effect metadata generating device may produce the moving direction and the moving distance of vector the variation with regard to the time of which is equal to or higher than a predetermined value, with reference to the central axis.

Figure 6:
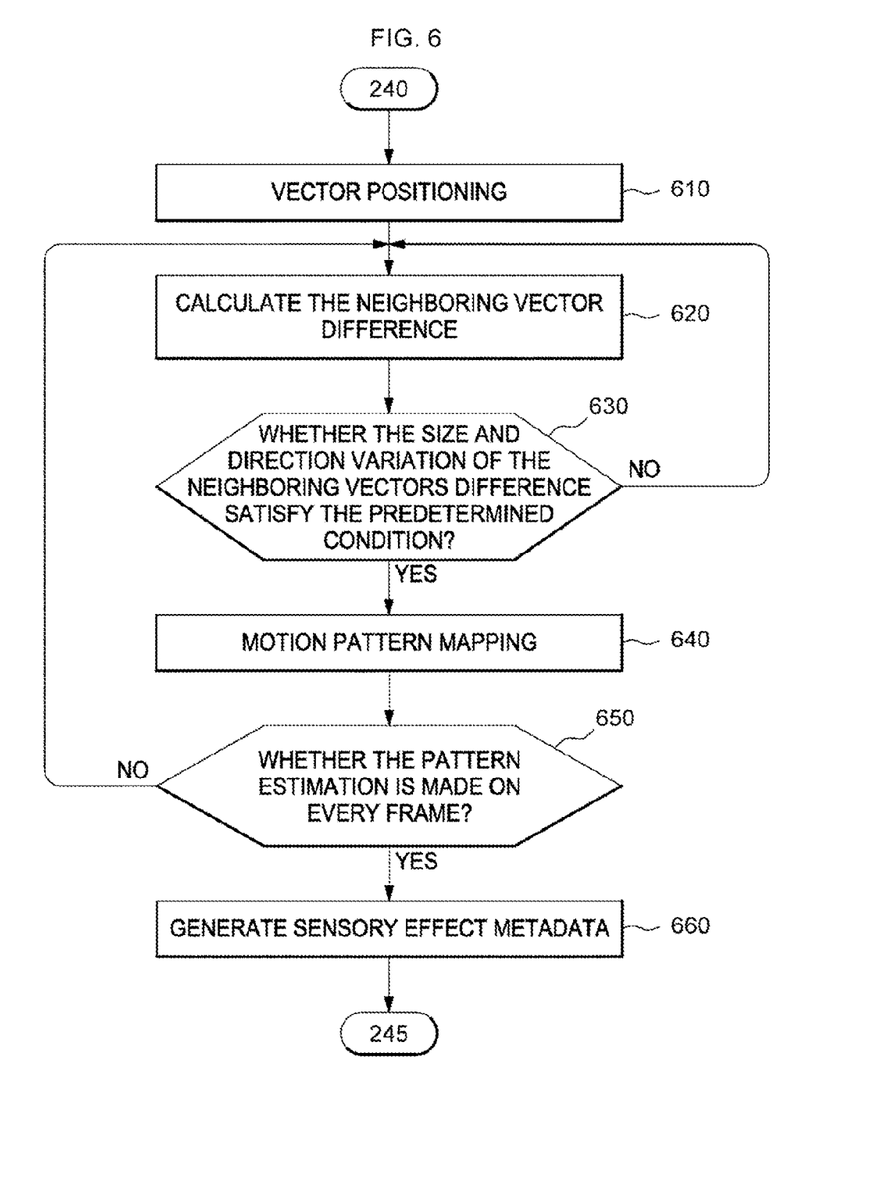
FIG. 6 is a flow chart illustrating the process of calculating a sensory effect metadata by the sensory effect metadata generating device according to one embodiment of this invention.

FIG. 6 is a flow chart for illustrating the process that the sensory effect metadata generating device produces the sensory effect metadata, according to one embodiment of this invention. The process described in FIG. 6 corresponds to the process of the step 250 of FIG. 2 as described above.

Referring to FIG. 6, in step 610 the sensory effect metadata generating device produces a vector by vector positioning the motion data in a predetermined three dimensional coordinates.

In step 620, the sensory effect metadata generating device produces a difference (hereinafter it is called as 'neighboring vector difference') between the neighboring vectors (the distance between which is minimum). Here, the sensory effect metadata generating device can select predetermined number of neighboring vectors in accordance with the predetermined rule, among vector-positioned vectors, in step 610.

In step 630, the sensory effect metadata generating device produce the size variation and the direction variation of the neighboring vector difference due to the frame change included in media, and determines whether the direction and size variation of the neighboring vector difference satisfy at least one of predetermined conditions. Here, the sensory effect metadata generating device can store the condition of the direction and size variation of the neighboring vector difference corresponding to respective motion pattern in advance.

If the direction and size variation of the neighboring vector difference satisfy at least one of predetermined condition(s) in step 630, the sensory effect metadata generating device maps the motion pattern corresponding to the condition(s) as a current motion pattern in step 640.

If the direction and size variation of the neighboring vector difference does not satisfy at least one of predetermined condition(s) in step 630, the sensory effect metadata generating device performs the step 620 with the neighboring vectors of next frame again.

In step 650, the sensory effect metadata generating device determines whether the pattern estimation is made on every frame.

If the pattern estimation is made on every frame in step 650, the sensory effect metadata generating device produces sensory effect metadata including every motion pattern(s), mapped in respective step 640, in step 660.

If the pattern estimation is not made on every frame in step 650, the sensory effect metadata generating device performs the step 620 with the neighboring vectors of next frame.

On the other hand, the method according to one embodiment of this invention can be implemented by program to be recorded in storage medium, which is performed by means for processing electronically information in various way. The storage medium can include program command(s), data file(s), data structure etc. alone or in combination.

The program command stored in storage medium can be specially designed and implemented or available to the skilled person in software field.

The examples of storage medium includes a magnetic media such as a hard-disk, a floppy-disk and a magnetic tape, an optical media such as CD-ROM and DVD, a magneto-optical media such as floptical disk, a hardware apparatus specially implemented for storing and performing the program command such as ROM, RAN, flash memory etc.

Also the above described media may be transmission media such as waveguide, metal line or light including carrier wave for transmission of signal which designates a program command, data structure etc. The examples of program command includes a machine language code which is made by compiling as well as a high-level language which can be executed by an electronically information processing apparatus such as computer.

The above described hardware apparatus can be implemented by at least software module for performing the processing of this invention and vice versa.

The spirit of the present invention has been described by way of example hereinabove, and the present invention may be variously modified, altered, and substituted by those skilled in the art to which the present invention pertains without departing from essential features of the present invention. Accordingly, the exemplary embodiments disclosed in the present invention and the accompanying drawings do not limit but describe the spirit of the present invention, and the scope of the present invention is not limited by the exemplary embodiments and accompanying drawings.

What is claimed is:

1. A sensory effect metadata generating device comprising:
    a memory for storing a program for generating a sensory effect metadata corresponding to media; and
    a processor for performing said program,
    wherein said program is configured to:
        extract characteristic points from said media;
        produce at least one of an object variation, an object zoom-in information, an incline information and a move information, based on said characteristic points; and
        generate said sensory effect metadata in accordance with said at least one of the object variation, the object zoom-in information, the incline information and the move information,
    wherein said program is further configured to:
        select variation characteristic points which are characteristic points having a variation higher than a predetermined value;
        select a region including the variation characteristic points as an object region, when a media is divided by regions having a predetermined size;
        calculate an object move vector by tracking the position of characteristic points on object region;
        calculate a rotation speed and a direction of the object based on the average variation of the characteristic points per respective regions having a predetermined size which constitute the object region; and
        select a central axis of the object and calculate an object inclination based on vector variation with reference to the central axis.

2. The sensory effect metadata generating device according to the claim 1,
    wherein said program is further configured to select effective characteristic points which locate at contour position of said object among said characteristic points, and generate said object zoom-in information in accordance with the width of octagon the vertex of which is size reference points of the effective characteristic points; and
    wherein said size reference point is through the center of said object and is a point which locates on the three lines having predetermined angles with a predetermined reference direction.

3. The sensory effect metadata generating device according to claim 2,
    wherein, when the distance between (i+1)th effective characteristic point and (i+2)th effective characteristic point is longer than or the same with the distance between (i)th effective characteristic point and said (i+2)th effective characteristic point, said program is further configured to compensate the value of said (i+1)th effective characteristic point with the value of said (i+2)th effective characteristic point to the same; and
    wherein said "i" is a natural number equal to or higher than "1" and said (i+1)th effective characteristic point is the effective characteristic point closest located at said (i)th effective characteristic among effective characteristic points following (i)th effective characteristic point.

4. The sensory effect metadata generating device according claim 1,
    wherein said program is further configured to:
        calculate average vectors of each characteristic point vectors per local sector;
        calculate a global rotation angle which is a rotation angle corresponding to the average of said average vector per said local sectors and generate an incline information including said global rotation angle, when the direction difference between said average vectors per said local sectors is more than a predetermined value; and
        generate a move information including the average of said average vectors per local sectors, when the direction difference between said average vectors per said local sectors is less than or equal to a predetermined value.

5. The sensory effect metadata generation device according to claim 4, wherein said program is further configured to apply a weighted value comparative with a radial type sector value to a target vector and then update said average vector as an average for each characteristic point vector per said local sectors, when a scalar value corresponding to the difference between said average vector and a target vector which is a vector among each characteristic point included in said local sectors is less than a predetermined value.

6. The sensory effect metadata generating device according to claim 1, wherein said program is further configured to:
    generate a motion data including at least one of said object variation based on the characteristic points, said object zoom-in information, said incline information, and said move information; and
    generate a sensory effect metadata mapped with a motion pattern corresponding to said motion data.

7. The sensory effect metadata generating device according to claim 6, wherein said program is further configured to:
    calculate vectors by vector positioning said motion data;
    calculate a neighboring vector difference corresponding to neighboring vectors among said vectors; and
    in case that said variation of said neighboring vector difference satisfy any one of one or more predetermined requirements, map the motion pattern corresponding to said satisfied requirement to a current motion pattern.

8. A method for generating a sensory effect metadata by a sensory effect metadata generating device, comprising the steps of:

extracting characteristic points from said media;

calculating at least one of an object variation, an object zoom-in information, an incline information and a move information, based on said characteristic points; and generating said sensory effect metadata in accordance with said at least one of the object variation, the object zoom-in information, the incline information and the move information, wherein said step of calculating at least one of an object variation, an object zoom-in information, an incline information and a move information, based on said characteristic points comprises the steps of:

selecting variation characteristic points which is characteristic points having a variation higher than a predetermined value;

electing a region including the variation characteristic points as an object region, when a media is divided by regions having a predetermined size;

calculating an object move vector by tracking the position of characteristic points on object region;

calculating a rotation speed and a direction of the object based on the average variation of the characteristic points per respective regions having a predetermined size which constitute the object region; and selecting a central axis of the object and calculate an object inclination based on vector variation with reference to the central axis.

9. The sensory effect metadata generating method according to the claim 8, wherein said step of calculating at least one of an object variation, an object zoom-in information, an incline information and a move information, based on said characteristic points comprises the steps of:

selecting effective characteristic points which locate at contour position of said object among said characteristic points; and generating said object zoom-in information in accordance with the width of octagon the vertex of which is a size reference point of effective characteristic points, and wherein said size reference point is through the center of said object and is a point which locates on the three lines having predetermined angles with a predetermined reference direction.

10. The sensory effect metadata generating method according to claim 9, wherein said step of calculating at least one of an object variation, an object zoom-in information, an incline information and a move information, based on said characteristic points further comprises the step of, when the distance between (i+1)th effective characteristic point and (i+2)th effective characteristic point is longer than or the same with the distance between (i)th effective characteristic point and said (i+2)th effective characteristic point, compensating the value of said (i+1)th effective characteristic point with the value of said (i+2)th effective characteristic point to the same; and wherein said "i" is a natural number equal to or higher than "1" and said (i+1)th effective characteristic point is the effective characteristic point closest located at said (i)th effective characteristic among effective characteristic points after (i)th effective characteristic point.

11. The sensory effect metadata generating method according claim 8, wherein said step of calculating at least one of an object variation an object zoom-in information, an incline information and a move information, based on said characteristic points comprises the steps of:

calculating average vectors of each characteristic point vectors per local sectors; calculating a global rotation angle which is a rotation angle corresponding to the average of said average vector per said local sectors and generate an incline information including said global rotation angle, when the direction difference between said average vectors per said local sectors is more than a predetermined value; and generating a move information including the average of said average vectors per local sectors, when the direction difference between said average vectors per said local sectors is less than or equal to a predetermined value.

12. The sensory effect metadata generation method according to claim 11, wherein said step of calculating at least one of an object variation, an object zoom-in information, an incline information and a move information, based on said characteristic points further comprises the step of: applying a weighted value comparative with a radial type sector value to a target vector and then update said average vector as an average for each characteristic point vector per said local sectors, when a scalar value corresponding to the difference between said average vector and a target vector which is a vector among each characteristic points included in said local sectors is less than a predetermined value.

13. The sensory effect metadata generating method according to claim 8, wherein said step of calculating at least one of an object variation, an object zoom-in information, an incline information and a move information, based on said characteristic points comprises the steps of:

generating a motion data including at least one of said object variation based on the characteristic points, said object zoom-in information, said incline information, and said move information; and generating a sensory effect metadata mapped with a motion pattern corresponding to said motion data.

14. The sensory effect metadata generating method according to claim 13, wherein the step for generating a sensory effect metadata mapped with a motion pattern corresponding to said motion data comprises the steps of:

calculating vectors by vector positioning said motion data; calculating a neighboring vector difference corresponding to neighboring vectors among said vectors; and in case that said variation of said neighboring vector difference satisfy any one of one or more predetermined requirements, mapping the motion pattern corresponding to said satisfied requirement to a current motion pattern.

* * * * *